United States Patent Office 3,460,435
Patented Aug. 12, 1969

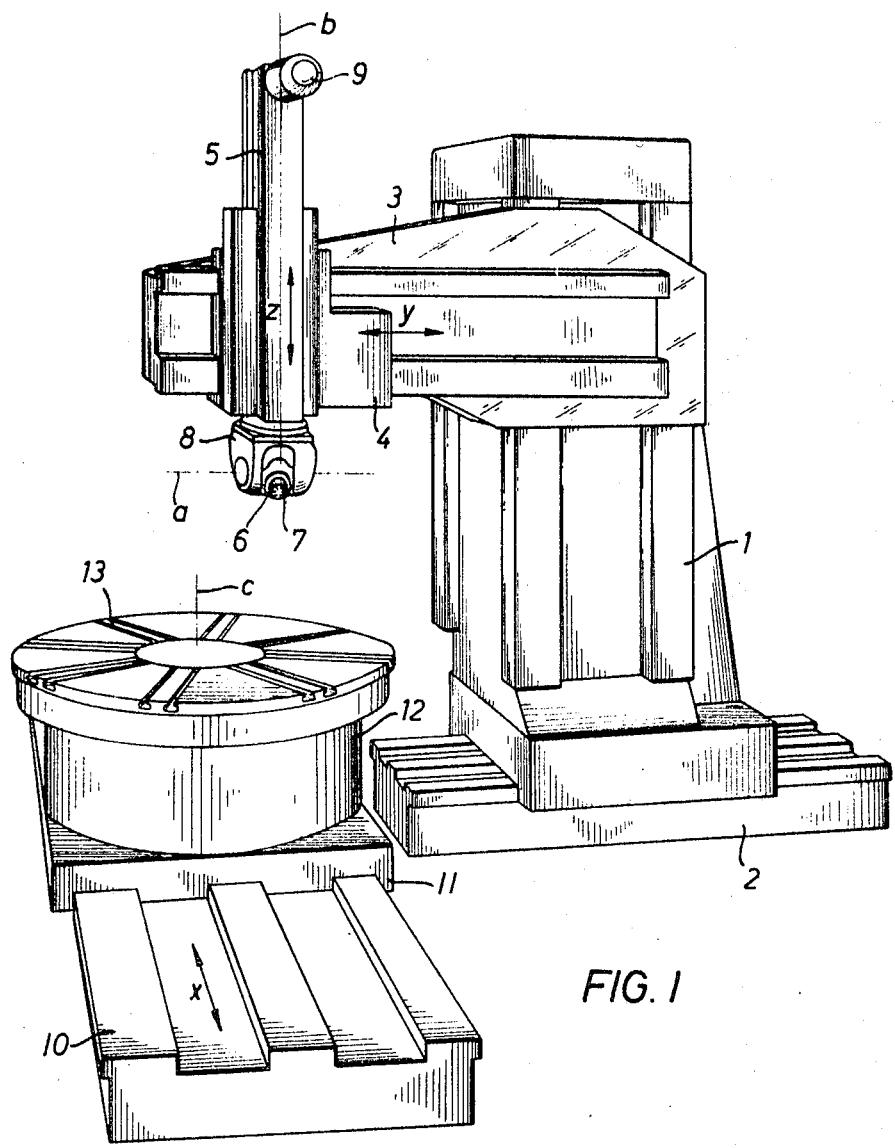
FIG. I

3,460,435
HEAVY MACHINE TOOL
Helmut Hucks, Monchen-Gladbach, and Fritz Noa and Julius Dahl, Rheydt, Germany, assignors to Maschinenfabrik Froriep G.m.b.H., Rheydt, Germany, a corporation of Germany
Filed May 8, 1967, Ser. No. 636,792
Claims priority, application Germany, Oct. 31, 1966, M 71,513
Int. Cl. B23c 1/06
U.S. Cl. 90—15                       1 Claim

ABSTRACT OF THE DISCLOSURE

A heavy machine tool is adapted for treating three-dimensionally curved surfaces by the use of numerical steering providing movements between workpiece and tool in relation to at least five different axes, the machine tool having a face plate or fixing table for the workpiece and a tool carrier adapted to hold a fixed tool and a rotary tool, one of said movements being an angular movement of the rotary tool.

---

This invention relates to a heavy machine tool and refers more particularly to machine tools of the type having a workpiece holder in the shape of a face plate or a fixing table and a tool carrier movable linearly in at least two different directions relatively to the workpiece, the tool carrier being adapted to receive fixed as well as rotary driven tools.

Present day industry requires workpieces, particularly those of substantial size, which are produced not only by milling but which must be also subjected to turning treatments. With existing machines it is not possible to carry out normal turning operations with a rotary workpiece and at the same time to produce thereon spatially curved surfaces without the use of a model or the like.

An object of the present invention is to eliminate these drawbacks of prior art machines and to provide a particularly advantageously operating machine combining turning operations with means producing workpiece surfaces which are curved in space.

Another object is the provision of a machine which in addition to milling and turning operations can be used for other working treatments and thus constitutes a machine and treating center providing the greatest possible facilities for the final treatment of a workpiece in a single clamping.

Other objects of the present invention will become apparent in the course of the following specification.

In the accomplishment of the objectives of the present invention it was found desirable to combine a machine of the described type wherein a suitable drive for a face plate or the like is used to carry out normal turning operations with a rotary workpiece, with numerical steering providing relative movements between the workpiece and the tool with respect to five or more axes, whereby one of the numerically steered movements is an angular movement of the rotating tool. This arrangement makes it possible to produce upon the same machine complicated shapes in three dimensions and in addition to carry out turning operations as on a conventional lathe with horizontal face plate. Thus the machine of the present invention is a universal machine tool which can be used to treat workpieces of most different types in different ways.

The rotary driven tool can be, for example, a front cutter or a head cutter. It is guided with its rotation axis by the numerical steering to the desired location relatively to the surface line of the workpiece section being treated. Furthermore, the tool can be a grinding disc, such as a pallet.

According to a feature of the present invention the rotary tool is received in a head which is rotatable or swingable relatively to the workpiece carrier in a manner known per se. This will advantageously bring the plane of the swinging movement as closely as possible to the tool.

In accordance with a preferred embodiment of the present invention the machine includes a cross bar mounted upon a post and having a support horizontally movable thereon. The support carries a vertically adjustable slide. Another slide is movable upon a transverse bed and carries the rotary fixing table for the workpiece. This machine is different from those known in prior art, including German specification No. 850,836, in that prior art machines were not constructed for the treatment of surfaces curved in space and could not carry out such treatments. On the other hand, the described embodiment of the present invention pertains to a machine which is capable of treating without any difficulty very long and very high workpieces with spatially curved surfaces.

Different possibilities exist concerning the selection of numerically steered movements. According to one embodiment of the present invention three linear movements and two angular movements are steered numerically.

Then the three linear movements usually extend in the directions of a right-angular system of coordinates. In a machine of the described construction with a support, a vertical slide and a bed slide carrying the rotary workpiece holder, the straight setting movements of these three members constitute the numerically steered linear movements.

As far as the numerically steered angular movements are concerned, which are rotary or swinging movements, one of them in any event is carried out by the tool. For that purpose, as already stated, a swingable or rotary head can be provided upon the tool carrier. It is also possible, however, to make swingable the tool carrier or the straight guide for the tool carrier.

In accordance with the present invention the second numerically steered angular movement can be that of the face plate or of the fixing table. For that purpose a feed drive is provided in addition to the high speed main drive used for the turning operations.

In accordance with a further feature of the present invention, in the case of three linearly actuated movements and two angularly actuated movements, the two numerically steered angular movements are movements of the rotary driven tool about two different axes. While there are other possibilities, one angular movement can be a rotation about an axis extending in the longitudinal direction of the tool carrier, while the other angular movement is a swinging movement about another axis, namely, the swinging movement of the tool head.

A further embodiment of the machine of the present invention provides numerically steered movements consisting of two linear movements and three angular movements. In that case the three numerically steered angular movements can consist of a movement of the fixing table about its axis of rotation and movements of the rotary tool about two different axes. Other details are the same as those already described.

Numerical steering besides being used for the treatment of surfaces curved in space by means of a milling or grinding tool, can be also set for carrying out turning operations. It that case, for example, only the linear movements of the tool carrier are effected in two directions. Obviously, the actuating means can then also take over the switching of the r.p.m. of the face plate and other signals important for the operation. The machine can be also provided with a turret which is switched on by the actuating means.

Besides turning tools, milling tools and grinding tools, it is also possible to use boring tools, polishing tools and various other tools. The machine can be also provided with a magazine for exchanging tools.

The machine of the present invention constitutes a true machine center or treating center which makes possible the treatment of complicated spatial forms without a model or the like and which, in addition, can carry out various operations, such as turning, boring, milling, grinding etc. with the same output as that of a conventional individual machine required for one of these purposes, the operations being carried out manually or by a numerically steered information carrier.

The invention will appear more clearly from the following detailed description when taken in connection with the accompanying drawings, showing by way of example, a preferred embodiment of the inventive idea.

In the drawings:

FIGURE 1 is a perspective view of a machine constructed in accordance with the principles of the present invention.

Figure 3:
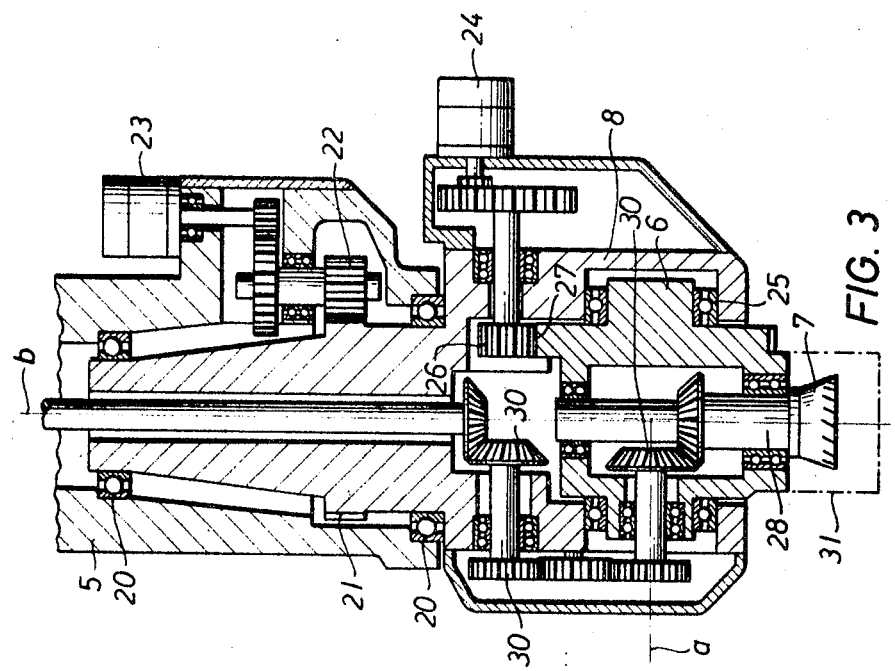
FIGURE 3 is a section along the lines III—III of FIG. 2.

The machine shown in FIG. 1 has a post 1 which is slidable upon a bed 2. The post 1 carries a cross bar 3 which is adjustable in the vertical direction. A flat slide or support 4 is carried by the cross bar 3 and is horizontally movable thereon. The support 4 carries a tool carrier 5 which is vertically adjustable and which has the shape of a slide. The lower end of the tool carrier has a head 6 which is swingable about an axis $a$ and which can hold a rotatably driven tool 7 as well as one or more immovable tools. An electric motor 9 is used to turn the rotary tools, if necessary by means of a drive located within the tool carrier 5. The swingable head 6 is mounted in a fork-like holder 8 which is rotatable about the longitudinal axis $b$ of the tool carrier 5.

Figure 2:
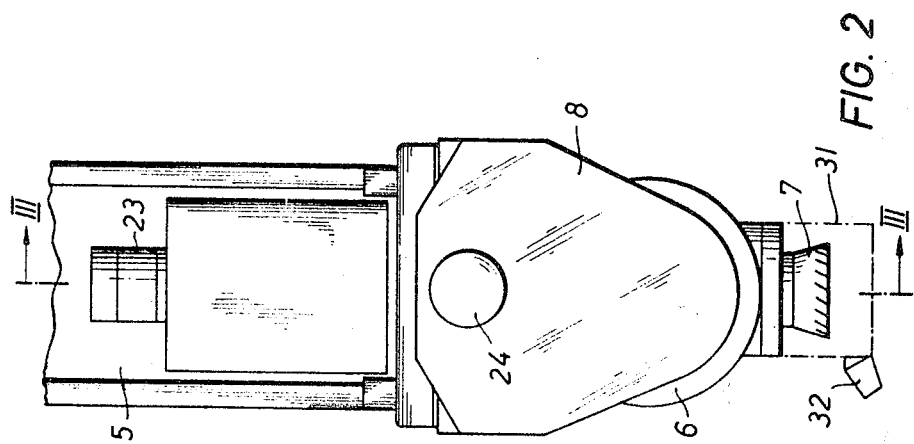
FIGURE 2 is a side view of the lower portion of the tool carrier on an enlarged scale.

As shown in FIGS. 2 and 3, the fork-like holder 8 is rotatably mounted in the tool carrier 5 by means of roller bearings 20 and is provided with a toothed rim 21 meshing with a pinion 22 of a drive which is free from play and which can be actuated in both directions of rotation by means of a drive 23.

A further drive 24 is used for swinging the head 6 which is mounted in the holder 8 by means of roller bearings 25, whereby the pinion 26 of a drive which is free from play meshes with a toothed segment 27 of the head.

A tool spindle 28 is mounted in the head 6; it can hold, for example, a front miller 7 or a different tool, and is driven from the electric motor 9 (shown in FIG. 1), if necessary by means of a drive with variable r.p.m. through a shaft 29 and spur and cone gears 30.

As shown by broken lines in FIGS. 2 and 3, the rotary driven tool 7 can be removed and then a tool holder 31 can be placed in the head 6; the tool holder 31 carries one or more fixed tools, such as a turning chisel 32 or the like.

However, it is also possible to provide a switch-operated turret.

Another bed 10 (FIG. 1) is located at right angles to the bed 2 carrying the post 1. A slide 11 is slidably mounted upon the bed 10 and carries a stand 12 for a face plate 13 rotatable about an axis $c$. The face plate 13 is actuated by a main drive (not shown) which can be located, for example, within the stand or within the slide to carry out turning operations; a special round feed drive (not shown) is used to turn the face plate 13 so as to set it without play.

The numerical steering is known in prior art. It is described, for example, in the book by W. Simon, issued in 1963; for that reason it is not shown in the drawings; it is used to produce linear movements indicated by arrows $x$, $y$ and $z$, namely, a movement of the slide 11 in a horizontal coordinate, a movement of the support 4 in the second horizontal coordinate and a movement of the tool carrier 5 in the vertical coordinate. The numerically steered angular movements can consist of feed movement of the face plate 13 about the axis $c$ as well as a swinging movement of the head 6 about the axis $a$ or about the axis $b$ with the use of drives 23 and 24. However, it is usually not necessary to numerically steer six movements, since a steering in five axes is sufficient even for treating spherical surfaces.

If in the last-mentioned instance three linear movements are steered numerically, then the numerically steered angular movements may consist, firstly, of the rotation of the face plate about the axis $c$ and the tool head movement about the axis $a$, secondly, of the rotation of the face plate and the movement of the tool head about the axis $b$ and, thirdly, the movements of the tool head about the two axes $a$ and $b$. This third arrangement is of particular interest for very large machines, wherein the face plate and the tool have large flywheel movements.

If there are to be three numerically steered angular movements and two numerically steered linear movements, then the linear movements preferably consist of the movements of the tool carrier 5 and of the support 4 which carries it. In that case a movable fed slide for the face plate can be eliminated, unless it is desired in order to carry out other operations which do not require a numerically steered bed slide.

According to a different embodiment of the present invention the support 4 can be provided, for example, with a swingable rotary member in which the tool carrier is slidably mounted. Then, if desired, the movements of the rotary member can be also steered numerically and can replace another numerically steered angular movement.

The present invention provides a universal machine tool. For turning operations it has all the advantages existing, for example, in a one stand lathe with horizontal face plate or in a similar turning machine. Furthermore, the same machine can be used for milling difficult spherical spatial shapes by a simultaneous actuation of the individual axes in the required combination. Finally, it can carry out other treatments corresponding to operations of conventional one purpose machines. Numerous operational possibilities are provided by suitable exchange of tools and partial operation of numerical steering, or by replacing the milling head with a turret head, or by additionally providing a magazine for tool exchange.

Figure 5:
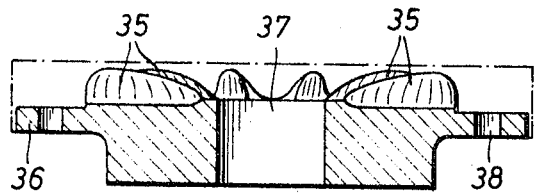
FIGURE 5 is a section along the line V—V of FIG. 4.
Figure 4:
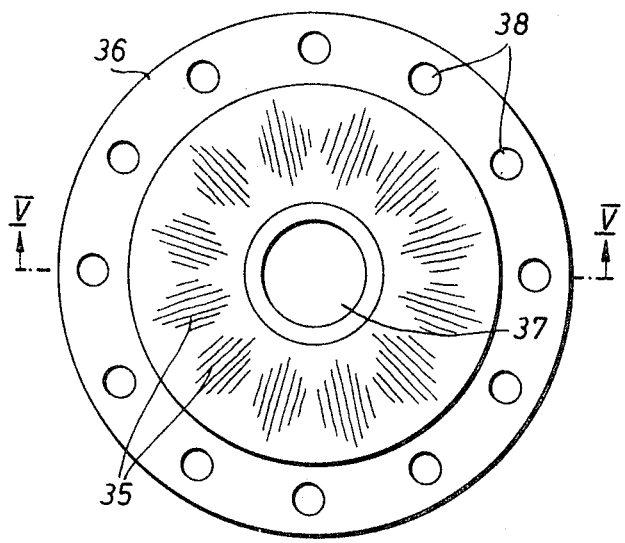
FIGURE 4 is a top view of a workpiece which can be produced by the machine of the present invention.

FIGS. 4 and 5 illustrate by way of example, a workpiece which can be easily produced in one clamping by the machine of the present invention. The original shape of the piece is indicated by broken lines in FIG. 5. The radially extending saddle-like curved raised portions 35 are produced by numerically steered profiled milling tools. The flange 36 and the central hole 37 can be produced by turning. The hole 37 can be also polished. The individual bore holes 38 can be produced by boring.

What is claimed is:

1. A heavy machine tool, comprising, in combination, a bed, a post mounted upon said bed and slidable thereon in a horizontal direction, a cross bar carried by said post and vertically adjustable thereon, a slide carried by said cross bar and slidable thereon in a horizontal direction, a tool carrier carried by said slide and vertically adjustable thereon, a holder mounted in said tool carrier and rotatable about a vertical axis, said vertical axis coinciding with the longitudinal axis of said tool carrier, a drive carried by said tool carrier and connected with said holder for rotating said holder, a head mounted in said holder for swingable movement about a horizontal axis, another drive carried by said tool holder and connected with said head for swinging said head, whereby said head is rotatable about two perpendicular axes, a tool spindle mounted in said head, a motor carried by said tool carrier, means connecting said motor with said tool spindle for driving said tool spindle, another bed, a slide mounted upon said other bed and slidable thereon in a horizontal direction perpendicular to the first-mentioned horizontal direction, a stand carried by the second-mentioned slide and a face plate rotatable about a vertical axis and carried by said stand.

References Cited

UNITED STATES PATENTS

| | | | |
|---|---|---|---|
| 2,499,842 | 3/1950 | Armitage | 90—15 |
| 2,758,515 | 8/1956 | Smith | 90—13.99 |
| 2,835,172 | 5/1958 | Barker et al. | 90—15 |
| 2,939,367 | 6/1960 | Thomas | 90—13.99 |
| 3,232,141 | 2/1966 | Swanson et al. | 90—13 |

FOREIGN PATENTS

| | | |
|---|---|---|
| 1,362,488 | 4/1964 | France. |
| 1,447,322 | 7/1966 | France. |
| 946,500 | 8/1956 | Germany. |

GERALD A. DOST, Primary Examiner